UNITED STATES PATENT OFFICE.

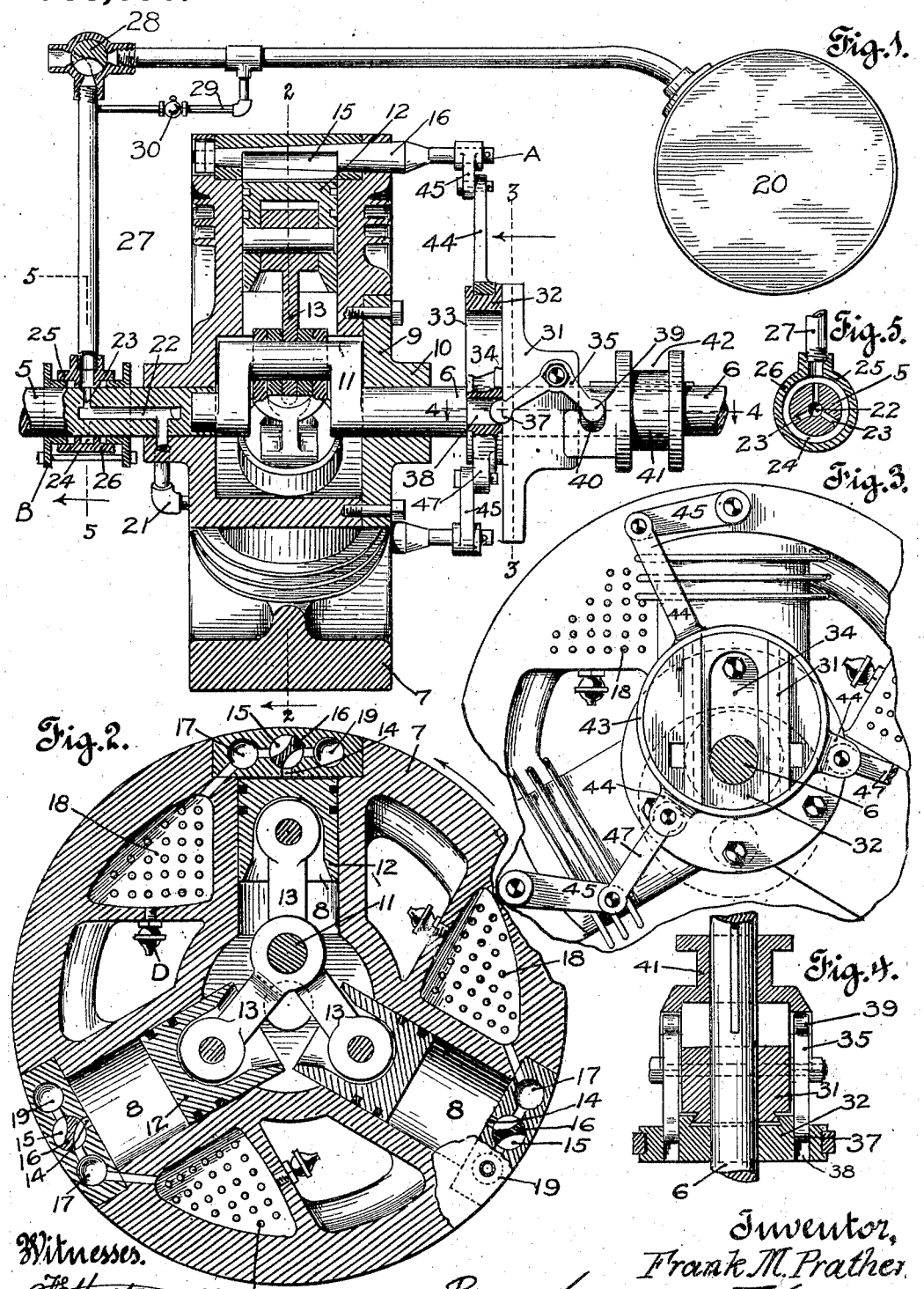

FRANK M. PRATHER, OF LOS ANGELES, CALIFORNIA.

CLUTCH AND POWER-TRANSMITTING DEVICE.

966,858.  Specification of Letters Patent.  Patented Aug. 9, 1910.

Application filed October 12, 1909.  Serial No. 522,275.

*To all whom it may concern:*

Be it known that I, FRANK MONROE PRATHER, a citizen of the United States, residing at Los Angeles, in the county of Los Angeles and State of California, have invented new and useful Improvements in Clutches and Power-Transmitting Devices, of which the following is a specification.

This invention relates to a clutch which also acts as a power transmitting device and is particularly adapted for use in conjunction with explosion motors and especially for explosion motors on automobiles, and is an improvement on my invention as shown and described in U. S. Letters Patent No. 902,761 of date of Nov. 3, 1908.

It is of the objects of this invention to provide a mechanism which will take the place of the usual clutch and fly-wheel, which will compress air for starting the motor and propelling the car for a reasonable distance—the clutch acting as a motor to drive the car on the compressed air, it will also reverse the driven mechanism and under certain conditions act as a brake. On the driving shaft is mounted a plurality of cylinders in which a corresponding plurality of pistons attached to the driven shaft are adapted to reciprocate. These pistons are mounted on a crank on the driven shaft while the cylinders are concentrically arranged around the axis of the driving shaft, so that upon any relative rotation of the two shafts the pistons will be reciprocated in the cylinders. By retarding the action of the pistons in the cylinders the driven member may be more or less rigidly locked to the driving member, forming thereby braking means, and this retarding means is preferably furnished by the compression air in the cylinders behind the pistons. Openings are provided which may be restricted and through which the air must pass from behind the pistons, and thus the amount of locking effort between the two members of the clutch may be regulated. Automatic valves are provided so that air is taken into the cylinders from the atmosphere and is pumped out through these valve regulated passageways into a muffler and thence to the atmosphere. Connected with these passageways is a pressure reservoir or air tank into which air may be pumped during the operation of the clutch. When it is desired to start the engine it is only necessary to turn the air from the air tank into the cylinders by means of regulating valves, which have been arranged for this purpose, and the clutch will cause the engine shaft to rotate and thereby start the engine. I accomplish these and other objects by means of the device described herein and illustrated in the accompanying drawings, in which:

Figure 1— is a longitudinal section of my improved clutch with the parts in position to act as a clutch, the air in the clutches being trapped therein. Fig. 2— is a section taken on line 2—2 of Fig. 1. Fig. 3— is a section taken on line 3—3 of Fig. 1. Fig. 4— is a section taken on line 4—4 of Fig. 1. Fig. 5— is a section taken on line 5—5 of Fig. 1.

In the drawings I have illustrated the clutch without any of the mechanism of an automobile on which it is preferably mounted, the operation of the parts being the same in whatever combination the clutch is placed, and will be understood without the illustration of any specific mechanism not forming a part of my invention.

The shafts 5, 6, are continuations of each other, shaft 5 being the driving shaft and 6 the driven shaft. Mounted on and keyed to the driving shaft, is a circular frame 7 forming the base of the driving member of the clutch and forming as well the fly-wheel of the engine. This frame is provided with a plurality of cylinders 8, preferably three in number and radially spaced around the driving shaft. Frame 7 forms a hollow box of general cylindrical shape and is provided on its end with a cover plate 9 having a bearing 10 for the driven shaft 6 therein. The driven shaft carries on its inner end a crank shaft 11 to which the pistons 12 are workably connected by the connecting rods 13, and, as the cylinders are concentrically arranged around shaft 5, as shown in Fig. 2, the pistons will be reciprocated in the cylinders upon any relative rotation of shafts 5 and 6. The remaining parts of the clutch consist particularly in the means to regulate the reciprocation of the pistons in the cylinders. In the head of each cylinder is port 14, communicating with valve bores 15 in which the rotary valve 16 is placed, on both sides of the valve bore are cylinders 17 and 19, both of which are in communication with the valve bore, one of these cylinders 17 communicating with the exhaust chamber or muffler 18 and the other chamber 19 communicating with the air pressure reservoir or tank 20.

The cylinder 19 is connected with the air pipe 21, which leads to the air passage 22 consisting of a central bore in the driving shaft 5. Extending outwardly from this bore are a plurality of ports 23, Fig. 5, which communicate with annular air chamber 24. This annular chamber is formed in the sleeve 25, which encircles the shaft 5 and forms the center of the stuffing box 26. This annular air chamber communicates with air pipe 27 leading therefrom to the three way valve 28. This valve forms means whereby the air passing through the pipe 27 may be caused to enter the air tank or be discharged into the open air as plainly indicated in Fig. 1. Leading around the valve 28 is the by-pass 29 on which is disposed a check valve 30 adapted to permit the air in restricted quantities to pass from the cylinders into the air tank when the pressure in the cylinders exceeds that in the tank at all times when the three way valve is closed to all passage therethrough, as shown in Fig. 1, but will not permit the air to pass outwardly from the tank when the pressure in the pipe 27 is less than it is in the reservoir. By this construction it will be manifest that upon any relative movement of the different elements of the clutch, air will be forced into and stored in the reservoir for future use.

Mounted rigidly upon the shaft 6 is a hub 31 carrying on its face toward the clutch a slide 32, on this slide an eccentric 33 is mounted. The eccentric has a slot 34 through which the driven shaft passes, the shaft limiting the movement of the eccentric. Pivotally mounted on the hub 31 is the bell crank lever 35, having projecting arms 37, 39, one of the arms 37 extends into the socket 38 in the slide 32 and by its reciprocation therein moves the slide up and down. The other arm 39 projects downwardly into the socket 40 formed in the slider or collar 41, which has a sliding non-rotatable movement on the shaft 6, this movement being imparted by any appropriate shifting device (not shown) the forks of which may be adapted to enter the annular grooves 42 on the slider to move the slider on the shaft. It will be seen that, by a movement of slider 41, the eccentric may be thrown into diametrically opposite positions, so that the actions of the valves connected thereto will be reversed and the whole mechanism operated in a reverse direction. The eccentric is provided with a strap 43 to which are connected three arms 44, one of these arms, the upper one, connecting directly with the lever 45 for the upper valve 16, the others connecting with the lower valve levers through the toggle links 47. This construction provides at once for the retaining of the eccentric strap in a fixed position and for operative connections between the eccentric and the valves. The eccentric is so placed on shaft 6 in relation to the position of crank 11 that valves 16 are moved in proper relation to the movements of their respective pistons. This movement throws the uppermost valve into the position shown in Fig. 2, connecting the cylinder compression port with the reservoir. When the eccentric is thrown to its dotted position, Fig. 3, the action of the valves is reversed and air is taken in from the compression port and discharged into the muffler. In this position when fluid pressure is supplied, the clutch acts as a motor, taking its feed from the compression tank and exhausting to atmosphere.

In the operation of my improved clutch it will be presumed that shaft 5 is in rotation, that the engine has been started and that shaft 6, connected with the traction wheels, is at rest. In this condition valve 28 stands in the position shown in dotted lines and the piston operates to draw in air from the atmosphere and to force it out through port 17. Valve 28 is then gradually thrown into the position shown in full lines and the pistons immediately begin to pump against an increasing pressure in pipe 27. An increasing rotary force is thereby placed upon the shaft 6 which begins to revolve more and more rapidly against the retardation of whatever mechanism it is connected to at its other end. When the valve 28 has reached the position shown in full lines the pistons cease to reciprocate in the cylinders as soon as they pump up a pressure in pipe 27 sufficient to rigidly lock shafts 5 and 6 together and transmit power from one to the other. A small amount of this pressure is allowed to pass through the by-pass 29 to the pressure tank until the pressure therein is sufficient to lock the pistons against movement in the cylinders when the clutch operates and locks both driving and driven shaft together. When it is desired to start shaft 5 and the engine connected thereto, it is first necessary to hold shaft 6 from rotation, which may be easily done in an automobile construction by braking the rear wheels. The position of the eccentric is then reversed so that the pistons and valves operate in a relative manner opposite to the normal. Valve 28 is thrown into its position to connect pipe 27 and the reservoir and pressure is admitted to valves 16 to operate pistons 12 in cylinders 8. The clutch then operates as a fluid pressure motor, the cylinders being rotated and with them shaft 5 and the engine connected thereto. As soon as the engine has been started, shaft 6 is unlocked and may then be connected to shaft 5 as before explained.

By this improved construction it will be seen that I have avoided exhausting directly into the atmosphere from the periphery of the clutch as shown in my former patent, but instead I cause the exhaust to pass into a plurality of mufflers carried by the clutch. I have also changed the manner of feeding air to and from the revolving cylinders from the compression tank and the atmosphere by means of my duplex stuffing box 26 in combination with the annular air chamber 24 in the stuffing box.

Having described my invention what I claim as new and desire to secure by Letters Patent is:

1. A clutch, comprising a driving and a driven member, cylinders mounted on said driving member, pistons mounted on said driven member and reciprocating in said cylinders, valves for said cylinders mounted thereon and having port connection therewith, a muffler formed in the frame of said clutch between said cylinders, said valves being also provided with ports to said mufflers, and a third port to an air compressor tank, and reversible means to operate said valve by the relative movement of said driving and driven members to alternately connect the cylinder port with the muffler and with the compression tank.

2. A clutch, comprising a driving and a driven member, cylinders mounted on said driving member, pistons mounted on said driven member and adapted to reciprocate in said cylinders upon the relative movement of the two members, valves for said cylinders mounted thereon and having port connection therewith, a muffler in the frame of said clutch between said cylinders said valves also having ports to said muffler and a third compression port, a pressure storage chamber, means to connect said compression port to said storage chamber or to the atmosphere, and reversible means on said driven member to operate said valve to connect the atmosphere and the compression port alternately to the port leading to said cylinder.

3. In a clutch of the character described having a plurality of radially extending cylinders and reciprocating pistons therein, a muffler for each cylinder, comprising a chamber in the frame of the clutch, said chambers communicating respectively with said cylinders.

In witness that I claim the foregoing I have hereunto subscribed my name this 5th day of October 1909.

FRANK M. PRATHER.

Witnesses:
    EDMUND A. STRAUSE,
    ETHEL COLEMAN.